US009371445B2

(12) United States Patent
Suzuki et al.

(10) Patent No.: US 9,371,445 B2
(45) Date of Patent: Jun. 21, 2016

(54) BIODEGRADABLE POLYESTER RESIN COMPOSITION

(71) Applicant: Kaneka Corporation, Osaka-shi, Osaka (JP)

(72) Inventors: Noriyuki Suzuki, Settsu (JP); Nobuo Nakamura, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 14/388,954

(22) PCT Filed: Mar. 29, 2013

(86) PCT No.: PCT/JP2013/059493
§ 371 (c)(1),
(2) Date: Sep. 29, 2014

(87) PCT Pub. No.: WO2013/147139
PCT Pub. Date: Oct. 3, 2013

(65) Prior Publication Data
US 2015/0073079 A1    Mar. 12, 2015

(30) Foreign Application Priority Data
Mar. 30, 2012 (JP) ................................. 2012-082310

(51) Int. Cl.
| | |
|---|---|
| C08G 63/60 | (2006.01) |
| C08K 5/10 | (2006.01) |
| C08K 5/103 | (2006.01) |
| C08L 67/02 | (2006.01) |
| C08J 5/18 | (2006.01) |
| C08L 67/04 | (2006.01) |
| C08L 101/16 | (2006.01) |

(52) U.S. Cl.
CPC .. *C08L 67/02* (2013.01); *C08J 5/18* (2013.01); *C08L 67/04* (2013.01); *C08J 2300/16* (2013.01); *C08J 2367/02* (2013.01); *C08J 2367/04* (2013.01); *C08J 2467/02* (2013.01); *C08J 2467/04* (2013.01); *C08K 5/103* (2013.01); *C08L 101/16* (2013.01)

(58) Field of Classification Search
None
See application file for complete search history.

(56) References Cited

U.S. PATENT DOCUMENTS

| | | | | |
|---|---|---|---|---|
| 4,426,477 A | * | 1/1984 | Yasumatsu et al. | ........... 524/306 |
| 2004/0225269 A1 | | 11/2004 | Zhao et al. | |
| 2012/0041109 A1 | * | 2/2012 | Krishnaswamy | ............. 524/101 |
| 2012/0315454 A1 | | 12/2012 | Wang et al. | |

FOREIGN PATENT DOCUMENTS

| | | |
|---|---|---|
| JP | 59-074148 A | 4/1984 |
| JP | 2006-525136 A | 11/2006 |
| JP | 2007-145423 A | 6/2007 |
| JP | 2009-073498 A | 4/2009 |
| JP | 2009-227882 A | 10/2009 |
| WO | WO-2011-080623 A2 | 7/2011 |

* cited by examiner

*Primary Examiner* — Susannah Chung
*Assistant Examiner* — Robert T Butcher
(74) *Attorney, Agent, or Firm* — Polsinelli PC

(57) ABSTRACT

This invention aims at improving the tear strength of a film and a sheet molded from a resin composition containing microorganism-produced aliphatic polyester. This invention relates to a biodegradable polyester resin composition containing polybutylene adipate terephthalate (PBAT) in the proportion of 60 to 400 parts by weight and modified-glycerin in the proportion of 10 to 50 parts by weight based on 100 parts by weight of aliphatic polyester (P3HA) having a repeating unit represented by Formula (1): [—CHR—CH$_2$—CO—O—] (wherein R is an alkyl group represented by C$_n$H$_{2n+1}$ and n is an integer of 1 or more and 15 or lower) and a film or a sheet obtained by molding the biodegradable polyester resin composition in which the maximum major axis of phases containing the aliphatic polyester (P3HA) measured by a transmission electron microscopy analysis-image analysis method (TEM method) is 18 μm or lower and the average value is 8 μm or lower.

11 Claims, 3 Drawing Sheets

Example 1

Comparative Example 1

BIODEGRADABLE POLYESTER RESIN COMPOSITION

CROSS REFERENCE TO RELATED APPLICATIONS

This application is a National Phase filing under 35 U.S.C. §371 of PCT/JP2013/059493 filed on Mar. 29, 2013; and this application claims priority to Application No. 2012-082310 filed in Japan on Mar. 30, 2012. The entire contents of each application is hereby incorporated by reference.

TECHNICAL FIELD

The present invention relates to a biodegradable polyester resin composition and a film and a sheet containing the same.

BACKGROUND ART

In recent years, under circumstances where environmental problems caused by plastic waste have been brought to the fore and realization of the society with an environmentally-sound material cycle of a global scale has been greatly desired, a biodegradable plastic decomposed into water and carbon dioxide by the action of microorganisms after use has drawn attention. Examples of the biodegradable plastic include 1) microorganism-produced aliphatic polyesters such as polyhydroxyalkanoate (hereinafter referred to as PHA), 2) petroleum-derived resin such as polylactic acid, polycaprolactone, polybutylene adipate terephthalate, polybutylene succinate adipate, and polybutylene succinate, and 3) natural polymers such as starch and cellulose acetate, and the like. However, among petroleum-derived aliphatic polyesters, the polylactic acid and the polycaprolactone have a problem with heat resistance and the natural polymers have problems in that the polymers are non-thermoplastic or have poor water resistance. Furthermore, from the viewpoint of a reduction in carbon dioxide emission, the society has increasingly become a society where the use of non-petroleum-derived resin with high biomass degree is desired. Then, the use of a biodegradable resin which contains plant materials and in which the proportion of the microorganism-produced aliphatic polyester which does not increase the carbon dioxide on the earth, i.e., carbon-neutral, has been desired.

Heretofore, as the film and the sheet containing the microorganism-produced aliphatic polyester, a film containing poly(3-hydroxybutyrate-co-3-hydroxyhexanoate, Abbreviation: PHBH) produced from microorganisms (Patent Document 1), a sheet containing a resin composition containing petroleum-derived resin such as polybutylene adipate terephthalate, polybutylene succinate adipate, polybutylene succinate, and polycaprolactone, and PHBH (Patent Document 2) and the like are disclosed.

However, when the microorganism-produced aliphatic polyester such as PHBH, and the resin composition containing the same have been molded into a film or a sheet by a blown film method or a T-die extrusion method, the tear strength in the MD direction (the withdrawal direction in molding) of the obtained film or the obtained sheet has been insufficient.

CITATION LIST

Patent Literatures

Patent Document 1: JP-A No. 2006-45365
Patent Document 2: International Publication WO2010/013483

SUMMARY OF INVENTION

Technical Problem

In view of the above-described problems, it is an object of the present invention to improve the tear strength in the MD direction of a film and a sheet molded from a resin composition containing microorganism-produced aliphatic polyester.

Solution to Problem

The present inventors have examined the microstructure (morphology) of the molded article to be obtained by a transmission electron microscopy analysis-image analysis method (TEM method) in order to solve the above-described problems, the present inventors have found that aliphatic polyester components are drawn and oriented in the withdrawal direction (MD direction) in molding. Furthermore, the present inventors have estimated that a reduction in the tear strength in the MD direction of the film or the sheet described above results from the drawn and oriented state of the above-described aliphatic polyester component, and then have further examined in order to adjust the morphology of the molded articles. As a result, the present inventors have found that, by the combined use of a specific amount of modified-glycerin in addition to the microorganism-produced aliphatic polyester and another biodegradable resin, the morphology of the resin material in the molded articles, such as the film and the sheet, can be controlled. Then, the present inventors have succeeded in increasing the tear strength in the MD direction of the molded articles, such as the film and the sheet for the first time by controlling the morphology, and thus have accomplished the present invention.

More specifically, a first aspect of the present invention relates to a biodegradable polyester resin composition containing polybutylene adipate terephthalate (PBAT) in the proportion of 60 to 400 parts by weight and modified-glycerin in the proportion of 10 to 50 parts by weight based on 100 parts by weight of aliphatic polyester (P3HA) having a repeating unit represented by Formula (1): [—CHR—CH$_2$—CO—O—] (wherein R is an alkyl group represented by C$_n$H$_{2n+1}$ and n is an integer of 1 or more and 15 or lower).

In a preferable embodiment, the biodegradable polyester resin composition is one for molding a film or one for molding a sheet.

In a preferable embodiment, the aliphatic polyester (P3HA) is at least one selected from the group consisting of poly(3-hydroxybutyrate-co-3-hydroxyhexanoate) (PHBH), poly(3-hydroxybutyrate) (P3HB), poly(3-hydroxybutyrate-co-3-hydroxyvalerate) (PHBV), poly(3-hydroxybutyrate-co-4-hydroxybutyrate) (P3HB4HB), poly(3-hydroxybutyrate-co-3-hydroxyoctanoate), and poly(3-hydroxybutyrate-co-3-hydroxyoctadecanoate).

In a preferable embodiment, the melt viscosity at 160° C. of the aliphatic polyester (P3HA) is 900 to 3,600 Pa·s.

In a preferable embodiment, the ratio (P3HA/PBAT) of the melt viscosity of the aliphatic polyester (P3HA) to the melt viscosity of the polybutylene adipate terephthalate (PBAT) is 0.5 or more.

In a preferable embodiment, polybutylene succinate (PBS) is further contained in the proportion of 20 to 150 parts by weight based on 100 parts by weight of the aliphatic polyester (P3HA).

In a preferable embodiment, the proportion of the aliphatic polyester (P3HA) based on the total amount of the aliphatic polyester (P3HA), the polybutylene adipate terephthalate (PBAT), and the polybutylene succinate (PBS) is 45% by weight or lower.

In a preferable embodiment, the modified-glycerin is acetylated monoglyceride.

A second aspect of the present invention relates to a film or a sheet, which is obtained by molding the biodegradable polyester resin composition, in which the maximum major axis of phases containing the aliphatic polyester (P3HA) measured by a transmission electron microscopy analysis-image analysis method (TEM method) is 18 μm or lower and the average value is 8 μm or lower.

In a preferable embodiment, the film or the sheet is molded by a blown film method or a T-die extrusion method.

In a preferable embodiment, the withdrawal speed in molding is 30 m/min or lower.

Advantageous Effects of Invention

The present invention can provide a film or a sheet which contains a biodegradable resin material, in which the proportion of microorganism-produced aliphatic polyester which does not increase the carbon dioxide on the earth, i.e., carbon neutral, is high, and in which the tear strength in the MD direction of a molded article is high.

DESCRIPTION OF EMBODIMENTS

Figure 1:
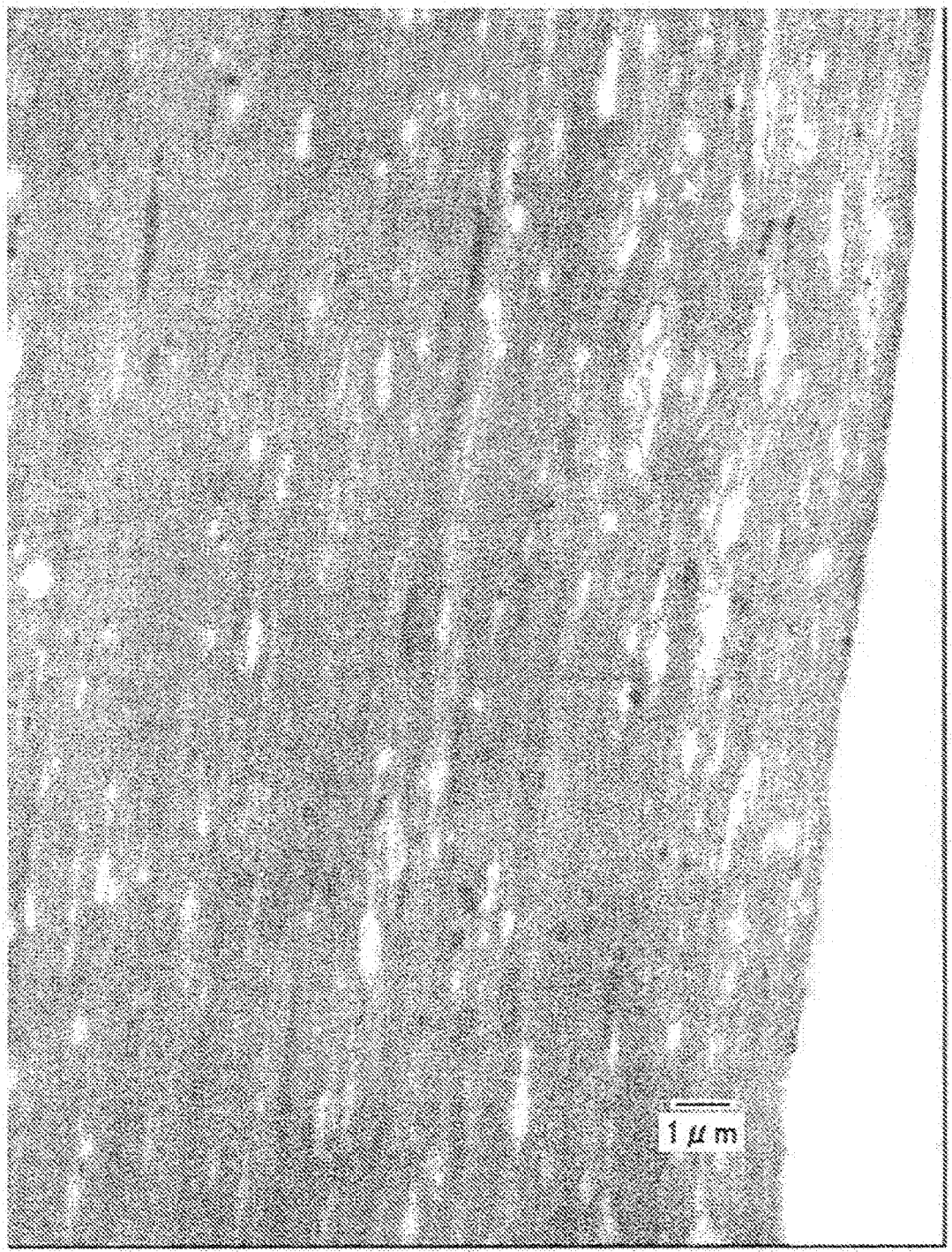
FIG. 1 is a TEM image of a film obtained in Example 1.

A biodegradable polyester resin composition according to the present invention contains aliphatic polyester (P3HA) having a repeating unit represented by Formula (1): [—CHR—CH$_2$—CO—O—] (wherein R is an alkyl group represented by C$_n$H$_{2n+1}$ and n is an integer of 1 or more and 15 or lower) and polybutylene adipate terephthalate (PBAT) in combination as resin components and further contains modified-glycerin.

Poly(3-hydroxyalkanoate) (Abbreviation: P3HA) for use in the present invention is produced from microorganisms and an aliphatic polyester polymer having a repeating unit represented by Formula (1): [—CHR—CH$_2$—CO—O—] (wherein R is an alkyl group represented by C$_n$H$_{2n+1}$ and n is an integer of 1 to 15).

Microorganisms which produce the P3HA are not particularly limited insofar as the microorganisms have production capacity of the P3HA. For example, known as microorganisms for producing a copolymer of hydroxybutyrate and another hydroxyalkanoate are *Aeromonas caviae* which is a microorganism for producing a copolymer containing 3-hydroxybutyrate and 3-hydroxyvalerate as a monomer unit (hereinafter abbreviated as "PHBV") and poly(3-hydroxybutyrate-co-3-hydroxyhexanoate) (hereinafter abbreviated as "PHBH"), *Alcaligenes eutrophus* which is a microorganism for producing poly(3-hydroxybutyrate-co-4-hydroxybutyrate), and the like. In particular, with respect to the PHBH, in order to increase the PHBH productivity, an *Alcaligenes eutrophus* AC32 strain (FERM BP-6038) into which genes of a PHA synthetase group are introduced (J. Bateriol., 179, p 4821-4830 (1997)) and the like are more preferable, and microorganism cells obtained by culturing these microorganisms under appropriate conditions to accumulate the PHBH in cells are used.

The weight average molecular weight of the P3HA for use in the present invention is preferably 50,000 to 3,000,000 and more preferably 100,000 to 1,500,000 from the viewpoint of the balance between the moldability and the physical properties. The weight average molecular weight used herein refers to one measured from a polystyrene conversion molecular weight distribution using gel permeation chromatography (GPC) employing a chloroform eluate.

As the P3HA for use in the present invention, one containing a repeating unit in which n of the alkyl group (R) in Formula (1) above is 1 or one containing a repeating unit in which n is 1 and a repeating unit in which n is at least one of 2, 3, 5, and 7 is preferable and one containing a repeating unit in which n is 1 and a repeating unit in which n is 3 is more preferable. Specific examples of the P3HA include poly(3-hydroxybutyrate) (Abbreviation: P3HB), poly(3-hydroxybutyrate-co-3-hydroxyhexanoate) (Abbreviation: PHBH), poly(3-hydroxybutyrate-co-3-hydroxyvalerate) (Abbreviation: PHBV), poly(3-hydroxybutyrate-co-4-hydroxybutyrate) (Abbreviation: P3HB4HB), poly(3-hydroxybutyrate-co-3-hydroxyoctanoate), poly(3-hydroxybutyrate-co-3-hydroxyoctadecanoate), and the like. Among the above, P3HB, PHBH, PHBV, and P3HB4HB are mentioned as those which are industrially easily produced.

Among the above, the PHBH containing a repeating unit in which n of the alkyl group (R) is 1 and a repeating unit in which n is 3 in Formula (1) above is preferable from the viewpoint that, by varying the composition ratio of the repeating unit, the melting point and the crystallization degree are varied, so that the physical properties such as Young's modulus and heat resistance can be varied, the physical properties between polypropylene and polyethylene can be imparted, and the PHBH is industrially easily produced as described above and is a plastic useful in terms of physical properties. A specific production method of the PHBH is described in International Publication WO2010/013483 (Patent Document 2), for example. As a commercially-available item of the PHBH, "AONILEX" (registered trademark) of Kaneka Corporation and the like are mentioned.

As the composition ratio of the repeating units of PHBH, the composition ratio of poly(3-hydroxybutyrate)/poly(3-hydroxyhexanoate) is preferably 80/20 to 99/1 (mol/mol) and more preferably 75/15 to 97/3 (mol/mol) from the viewpoint of the balance between the flexibility and the strength. This is because the composition ratio is preferably 99/1 or lower in terms of flexibility and is preferably 80/20 or more in terms of the fact that resin has moderate hardness.

In the PHBV, the melting point, the Young's modulus, and the like vary based on the ratio of the 3-hydroxybutyrate (3HB) component and the 3-hydroxyvalerate (3HV) component. However, since the 3HB component and the 3HV component are co-crystallized, the crystallization degree is as high as 50% or higher and the PHBV is flexible as compared with poly 3-hydroxybutyrate (P3HB) but the elongation at break tends to be as low as 50% or lower.

In the P3HA for use in the present invention, the melt viscosity at 160° C. is preferably 900 to 3,600 Pa·s. When the melt viscosity is lower than 900 Pa·s, the melt viscosity ratio to the polybutylene adipate terephthalate (PBAT) becomes small, so that the morphology in resin compositions and molded articles obtained from the resin compositions, such as a film and a sheet, is difficult to control in some cases. When the melt viscosity is higher than 3,600 Pa·s, the molding processability is inferior in some cases. In the present invention, the melt viscosity can be increased by adding isocyanate to the P3HA.

In the P3HA produced by microorganisms, the crystallization speed is particularly slow among aliphatic polyesters. Therefore, the use of the processing method as in the present invention is particularly effective. Moreover, the P3HA is excellent in the biodegradability under any environment, such as an aerobic environment and an anaerobic environment, and does not generate poisonous gas in combustion. In particular, the PHBH is also preferable because the PHBH has such excellent properties that the PHBH does not contain a petroleum-derived substance as the raw material and contains plant raw materials and the PHBH does not increase the carbon dioxide on the earth, i.e., carbon-neutral. Moreover, the present invention is advantageous in that a non-biodegradable crystal nucleus agent is not added and the excellent biodegradability of the P3HA is not impaired.

The polybutylene adipate terephthalate (PBAT) for use in the present invention refers to a random copolymer of 1,4-butane diol, adipic acid, and terephthalic acid and is particularly preferably PBAT obtained by a reaction of (a) a mixture mainly containing 35 to 95% by mol of adipic acid or an ester forming derivative thereof or a mixture thereof and 5 to 65% by mol of terephthalic acid or an ester forming derivative thereof or a mixture thereof (Total of each % by mol is 100% by mol.) and (b) a mixture containing butane diol (wherein the molar ratio of (a) and (b) is 0.4:1 to 1.5:1) as described in JP-T No. H10-508640. As a commercially-available item of the PBAT, "Ecoflex" (registered trademark) manufactured by BASF and the like are mentioned.

The content of the PBAT in the biodegradable polyester of the present invention is preferably 60 to 400 parts by weight and more preferably 100 to 250 parts by weight based on 100 parts by weight of the P3HA. When the content is lower than 60 parts by weight, the P3HA cannot form a discontinuous layer in a dispersion state, and therefore the tear strength decreases in some cases. When the content exceeds 400 parts by weight, the moldability decreases in some cases.

By further compounding modified-glycerin in the above-described resin components in the biodegradable polyester resin composition of the present invention, the morphology in the resin composition and molded articles obtained from the resin compositions, such as a film and a sheet, can be controlled.

As the modified-glycerin, acetylated monoglycerides such as glycerin diaceto monolaurate, glycerin diaceto monocaprylate, and glycerin diaceto monodecanoate are preferable. As a commercially-available item of the modified-glycerin, "RIKEMAL" (registered trademark) PL series of Riken Vitamin Co., Ltd., and the like are mentioned.

The content of the modified-glycerin to the biodegradable polyester of the present invention is preferably 10 to 50 parts by weight and more preferably 20 to 40 parts by weight based on 100 parts by weight of the P3HA. When the content is lower than 10 parts by weight, the maximum value and the average value of the major axis of each phase containing the P3HA become excessively large, the P3HA cannot form a discontinuous layer in a dispersion state, and the tear strength of a film and a sheet decreases in some cases. When the content exceeds 50 parts by weight, the effects do not change any more and bleed-out may occur.

Moreover, in the biodegradable polyester resin composition of the present invention, due to the fact that polybutylene succinate (PBS) is contained, there is action of lowering the melt viscosity of the PBAT. Therefore, the biodegradable polyester resin composition of the present invention is excellent in that the viscosity ratio of the P3HA to the PBAT increases, the P3HA easily forms a non-continuous phase, and the tear strength improves. The PBS is an aliphatic polyester copolymer synthesized by dehydration polycondensation of 1,4-butane diol and succinic acid, and "Bionolle" manufactured by Showa Denko K.K. and the like are mentioned as a commercially-available item thereof.

From the viewpoint that the tear strength is not affected, the content of the PBS in the biodegradable polyester of the present invention is preferably 20 to 150 parts by weight and more preferably 40 to 120 parts by weight based on 100 parts by weight of the P3HA.

To the resin composition of the present invention, at least one of a filler, colorants such as pigments and dyes, odor absorbents such as activated carbon and zeolite, flavor such as vanillin and dextrin, an oxidation inhibitor, an antioxidant, a weatherability improvement agent, an ultraviolet absorber, a plasticizer, a lubricant, a mold release agent, a water repellent agent, an antibacterial agent, a slidability improvement agent, and other secondary additives used as usual additives in the range where the effects of the present invention are not impaired may be added.

In the present invention, the above-described resin composition and a film and a sheet obtained from the resin composition are obtained by controlling the morphology. Specifically, the film and the sheet obtained from the resin composition are obtained by controlling the morphology in such a manner that the maximum major axis of phases containing the P3HA measured by a transmission electron microscopy analysis-image analysis method (TEM method) is 18 μm or lower and the average value is in the range of 8 μm or lower in the film and the sheet obtained from resin composition and the P3HA forms a discontinuous layer in a dispersion state.

The TEM method in the present invention refers to a method including cutting out an about 100 nm thick piece from the film or the sheet using a microtome in parallel to the surface of the film or the sheet in such a manner that the observation in the MD direction can be performed, selectively dyeing the P3HA with ruthenium tetroxide ($RuO_4$), osmium tetroxide, phosphotungstic acid, and the like, taking a photograph of the state of the phases containing the P3HA when the section of the film or the sheet is observed from the plane direction at an accelerating voltage of 80 kV using a transmission electron microscope (manufactured by JEOL Ltd., JEM-1200EX) with a magnification of 10,000 times, and then automatically measuring the major axis and the average value thereof of the phases containing the P3HA in the range of about 18 m×about 25 μm of the image by binarized image analysis software (manufactured by Mitani Corporation, "Win Roof"). With respect to the phases containing the P3HA which cannot be distinguished with the image-analysis software, the major axis is manually determined.

The major axis of the phases containing the P3HA indicates the longest diameter in each phase containing the P3HA in the image which is observed under a microscope and the average value indicates the average value of the major axes of all the phases containing the P3HA present in the visual field. When measuring the major axis, three visual field are observed at random as the visual fields to be observed.

Examples of the method for controlling the morphology include 1) a method for setting the ratio (P3HA/PBAT) of the melt viscosity of the aliphatic polyester (P3HA) to the melt viscosity of the polybutylene adipate terephthalate (PBAT) to 0.5 or more, preferably 0.7 or more, and still more preferably 1.0 or more, 2) a method for setting the ratio of the amount of the aliphatic polyester (P3HA) based on the total amount of the aliphatic polyester (P3HA), the polybutylene adipate terephthalate (PBAT), and the polybutylene succinate (PBS) to 45% by weight or lower and preferably 40% by weight or lower, and, in molded articles such as a film and a sheet, 3) a method for setting the withdrawal speed in molding to 30 m/min or lower, preferably 25 m/min or lower, and more preferably 20 m/min or lower.

The ratio (P3HA/PBAT) of the melt viscosity in 1) above is the melt viscosity ratio at 160° C. of the P3HA and the PBAT. When the melt viscosity ratio is lower than 0.5, the PHBH constitutes a continuous phase in the resin, so that the tear strength in the MD direction in molded articles, such as a film and a sheet, excessively decrease in some cases. The upper limit of the ratio of the melt viscosity of the P3HA to the melt viscosity of the PBAT is not particularly limited and is preferably 2.0 or lower from the viewpoint that when the ratio is excessively large, the viscosity of the resin composition becomes excessively high, so that the molding processability decreases in some cases and the P3HA is easily finely dispersed. Herein, the "ratio (P3HA/PBAT) of the melt viscosity of the P3HA to the melt viscosity of the PBAT" refers to a value obtained by dividing the melt viscosity of the P3HA by the melt viscosity of the PBAT.

Examples of a method for measuring the melt viscosity includes a method for measuring the melt viscosity using a high shear viscometer capillary rheometer at a preset temperature of 160° C. to 170° C., a capillary size of φ1 mm, a length of 10 mm, and a shear rate of 100 (1/sec) to 2,000 (1/sec). In Examples described later, the melt viscosity is measured by this method.

In the method of 2) above, when the proportion of the aliphatic polyester (P3HA) exceeds 45% by weight, the PHBH constitutes a continuous phase in the resin, so that the tear strength in the MD direction in molded articles, such as a film and a sheet, excessively decrease in some cases. The lower limit of the proportion of the aliphatic polyester (P3HA) is not particularly limited and the proportion of the content of the aliphatic polyester (P3HA) is preferably 1% by weight or more from the viewpoint that the nonpetroleum degree becomes large. When the proportion of the aliphatic polyester (P3HA) is excessively small, the effect of increasing the proportion of the microorganism-produced aliphatic polyester which is carbon-neutral decreases. Therefore, the proportion of the aliphatic polyester (P3HA) is more preferably 20% by weight or more and still more preferably 25% by weight or more.

In the method of 3) above, when the withdrawal speed in the molding of a film, a sheet, and the like exceeds 30 m/min, the major axis of phases containing the P3HA in the film, the sheet, and the like become excessively long, and further a phase continuous in the MD direction is obtained, so that the tear strength considerably decreases in some cases.

By any one of the methods 1) to 3) above, the film and sheet of the present invention in which the maximum major axis of discontinuous phases containing the P3HA is 18 μm or lower and the average value is 8 μm or lower can be obtained.

The resin composition of the present invention can be produced by known methods, such as a method including performing heating and melting using a single axis extruder, a twin screw extruder, and the like. The film or the sheet of the present invention can be manufactured by known molding processing methods such as a blown film method and a T-die extrusion method. Specific conditions may be set as appropriate and, for example, in a blown film method, it is preferable to perform drying until the moisture content of pellets reaches 500 ppm or lower with a dehumidification drier or the like before inflation molding, and then setting the cylinder preset temperature to 100° C. to 160° C. and the preset temperature of an adapter and a die to 130° C. to 160° C.

The thickness of the film or the sheet is not strictly specified. In general, one having a thickness of about 1 to 100 μm is referred to as a film and one having a thickness up to about 20 mm exceeding 100 μm is referred to as a sheet.

The film or the sheet of the present invention can be suitably used for agriculture, fishing, forestry, gardening, medical science, health articles, food industry, garments, non-garments, packaging, automobiles, building materials, and other fields. For example, the film or the sheet of the present invention are used for multifilms for agriculture, fumigation sheets for forestry, binding tapes including a flat yarn and the like, root wrapping films of garden trees, backseats of diapers, packaging sheets, shopping bags, garbage bags, drainer bags, other compost bags, and the like.

EXAMPLES

The present invention is more specifically described with reference to Examples and Comparative Examples described below but the present invention is not limited to Examples at all.

Manufacturing Example 1

3-hydroxyalkanoate polymer

PHBH (Raw material A-1) used in this example was produced as follows.

For culturing and production of PHA, a KNK-631 strain (refer to International Publication WO2009/145164) was used.

The composition of a seed culture medium was set to 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$ and a pH of 6.8.

The composition of a preculture medium was set to 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and a 0.5 v/v % trace metal salt solution (1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ were melted in 0.1 N hydrochloric acid). As the carbon source, palm kernel petroleum was added at once with a concentration of 10 g/L.

The composition of the PHA production culture medium was set to 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, a 0.5 v/v % trace metal salt solution (1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiC_2.6H_2O$ were melted in 0.1 N hydrochloric acid), and 0.05 w/v % BIOSPUREX200K (Antifoaming agent: manufactured by Cognis Japan).

First, a glycerol stock (50 μL) of the KNK-631 strain was inoculated into the seed culture medium (10 ml, and then cultured for 24 hours for seed culturing. Next, 1.0 v/v % of a seed culture solution was inoculated into a 3 L jar fermentor (MDL-300 type, manufactured by B. E. Marubishi Co., Ltd.) in which 1.8 L of the preculture medium was placed. The operating condition were set to a culture temperature of 33° C., a stirring speed of 500 rpm, and an airflow amount of 1.8 L/min. The culturing was performed for 28 hours while controlling the pH between 6.7 to 6.8 for pre-culturing. For pH control, 14% aqueous ammonium hydroxide solution was used.

Next, 1.0 v/v % of the pre-culture solution was inoculated into a 10 L jar fermentor (MDS-1000 type, manufactured by B.E.Marubishi Co., Ltd.) in which 6 L of a production culture medium was placed. The operating condition were set to a culture temperature of 28° C., a stirring speed of 400 rpm and an airflow amount of 6.0 L/min, and the pH was controlled between 6.7 and 6.8. For the pH control, a 14% aqueous ammonium hydroxide solution was used. As the carbon source, palm core olein petroleum was used. The culture was performed for 64 hours. After the end of the culture, microbial cells were recovered by centrifugal separation, washed with methanol, and then freeze-dried. Then, the weight of the dry microbial cells was measured.

100 mL of chloroform was added to 1 g of the obtained dry microbial cells, and then stirred at room temperature one whole day and night. Then, PHA in the microbial cells was extracted. The microbial cell residue was separated by filtration, and then concentrated by an evaporator until the total capacity was 30 mL. Then, 90 mL of hexane was gradually added, and then the resultant substance was allowed to stand for 1 hour while slowly stirring. The deposited PHA was separated by filtration, and then vacuum dried at 50° C. for 3 hours, whereby PHA was obtained. The composition analysis of 3-hydroxyhexanoate (3HH) of the obtained PHA was performed by gas chromatography as follows. 2 mL of a sulfuric acid-methanol mixed liquid (Capacity ratio 15:85) and 2 mL of chloroform were added to 20 mg of the dry PHA. Then, the container was hermetically sealed, and then heated at 100° C. for 140 minutes, whereby methyl ester which was a PHA decomposed material was obtained. After cooling, 1.5 g of sodium hydrogencarbonate was gradually added thereto for neutralization, and then allowed to stand until the generation of carbon dioxide stopped. 4 mL of diisopropyl ether was added, sufficiently mixed, and then centrifugal separation was performed to analyze the monomer unit composition of the polyester decomposed material in the supernatant by capillary gas chromatography. As the gas chromatograph, GC-17A manufactured by Shimadzu Corporation was used. As the capillary column, NEUTRA BOND-1 (Column length of 25 m, Column inner diameter of 0.25 mm, Liquid film thickness of 0.4 μm) manufactured by GL Science, Inc. was used. As the carrier gas, He was used. The column inlet pressure was set to 100 kPa and 1 μL of a sample was injected. As the temperature conditions, the temperature was increased at a rate of 8° C./min to the initial temperature of 100 to 200° C., and then the temperature was further increased at a rate of 30° C./min to 200 to 290° C. As a result of performing the analysis under the conditions, PHA represented in Chemical Formula (1) above and poly(3-hydroxybutyrate-co-3-hydroxyhexanoate) were confirmed. The 3HH composition was 11.2% by mol. After the culture, PHBH was obtained from the culture solution according to the method described in International Publication WO2010/067543. The weight average molecular weight measured by GPC was 570,000. Moreover, the melt viscosity at 160° C. of the PHBH was measured to be 1,150 Pa·s.

In Examples and Comparative Examples below, the following materials were also used.

<3-hydroxyalkanoate polymer>

Raw material A-2: PHBH with Mw of 320,000, 3HH of 11.2% by mol, a melt viscosity at 160° C. of 510 Pa·s (manufactured by Kaneka Corporation), which was obtained by hydrolyzing the raw material A-1 at 80° C. for 72 hours at a relative humidity of 95%.

Raw material A-3: PHBH with Mw of 790,000, 3HH of 10.4% by mol, a melt viscosity at 160° C. of 1,910 Pa·s, which was obtained in the same manner as in Manufacturing Example 1, except setting the culture time to 96 hours.

Raw material A-4: The raw material A-4 was obtained by 2 parts by weight of an isocyanate compound (manufactured by Nippon Polyurethane Industry Co., Ltd., Millionate MR200) based on 100 parts by weight of the raw material A-1 was melted and kneaded by a twin screw extruder at a preset temperature of 100 to 130° C. and at a screw rotation speed of 100 rpm. The melt viscosity of the obtained materials A-4 was 2,350 Pa·s.

Raw material A-5: PHBH with Mw of 480,000, 3HH of 11.2% by mol, and a melt viscosity at 160° C. of 940 Pa·s (manufactured by Kaneka Corporation), which was obtained by hydrolyzing the raw material A-1 at 80° C. for 36 hours at a relative humidity of 95%.

Raw material A-6: PHBH with Mw of 620,000, 3HH of 5.4% by mol, and a melt viscosity at 160° C. of 1,240 Pa·s (manufactured by Kaneka Corporation), which was obtained in the same manner as in Manufacturing Example 1, except using a KNK-005 strain in place of the KNK-631 strain.

<Polyester>

Raw material B-1: PBAT with a melt viscosity at 160° C. of 1,800 Pa·s (manufactured by BASF, "Ecoflex (registered trademark)").

Raw material B-2: PBS (manufactured by Showa Denko K.K "Bionolle (registered trademark)").

<Modified-Glycerin Compound>

Raw material C-1: Acetylated monoglyceride (manufactured by Riken Vitamin Co., Ltd., "RIKEMAL" (registered trademark) PL012).

Examples 1 and 2

(Manufacturing of Resin Composition)

100 parts by weight of the polyester B-1 (PBAT), 50 parts by weight of the polyester B-2 (PBS), and 25 parts by weight of the modified-glycerin compound C-1 (acetylated monoglyceride) based on 100 parts by weight of the 3-hydroxyalkanoate polymer (Raw material A-1) were melted and kneaded with a twin screw extruder (manufactured by Japan Steel Works, Ltd.: TEX30) at a preset temperature of 100 to 130° C. and at a screw rotation speed of 100 rpm, thereby obtaining a polyester resin composition containing PHBH.

(Manufacturing of Film)

The obtained resin composition was molded into a film using a blown film molding machine (manufactured by Hokushin Sangyo Co., Ltd.) at a circular die lip thickness of 1 mm, a circular die lip diameter of 100 mm, a preset temperature of 120 to 140° C., and a withdrawal speed shown in Table 1.

(Measurement of Tear Strength in MD Direction)

The obtained film molded article or sheet molded article was measured for the tear strength using Elmendorf tear strength tester (manufactured by Kumagai Machinery Co. Ltd.) according to JIS P8116.

(Observation of Dispersion State of PHBH)

An about 100 nm thick thin piece sample was cut out from the obtained film or sheet molded article using a microtome in parallel to the surface of the film or the sheet in such a manner that the observation in the MD direction can be performed, dyed with $RuO_4$, and then the PHBH dispersion state was observed using a transmission electron microscope (TEM) (manufactured by JEOL Co., Ltd., JEM-1200EX) at an accelerating voltage of 80 kV. FIG. 1 shows a TEM image of the film obtained in Example 1. In FIG. 1, the vertical direction is the withdrawal direction (MD direction).

(Calculation of Major Axis)

The maximum major axis and the average major axis were calculated using image-analysis software (manufactured by Mitani Corp., "Win Roof"). The value was calculated in the range of about 18 μm×about 25 μm of the TEM image taken with a magnification of 10,000 times.

Figure 2:
FIG. 2 is an image in which the TEM image of FIG. 1 is processed with image-analysis software and the major axis of PHBH is distinguished.

A contrast was given to the image by RuO₄ dyeing. However, when the contrast is not clear, the distinction of phases containing PHBH by binarization processing with analysis software is difficult to perform in some cases. In such a case, the major axis was manually determined from the TEM photograph. FIG. 2 shows the state of the image in which the major axis of the PHBH was distinguished with the image-analysis software.

Example 3

The resin composition obtained in Example 1 was molded into a sheet, and then the tear strength and the maximum major axis and the average major axis of phases containing PHBH were measured in the same manner as in Example 1.
(Molding of Sheet)

The obtained resin composition was molded into a sheet using a T-die sheet molding machine (manufactured by Toyo Seiki Seisakusho Co., Ltd.: Laboplastomill), at a die lip thickness of 250 μm, a die lip width of 150 mm, a cylinder preset temperature of 120 to 140° C., a die preset temperature of 150 to 160° C., and a withdrawal speed shown in Table 1.

Comparative Example 1

Figure 3:
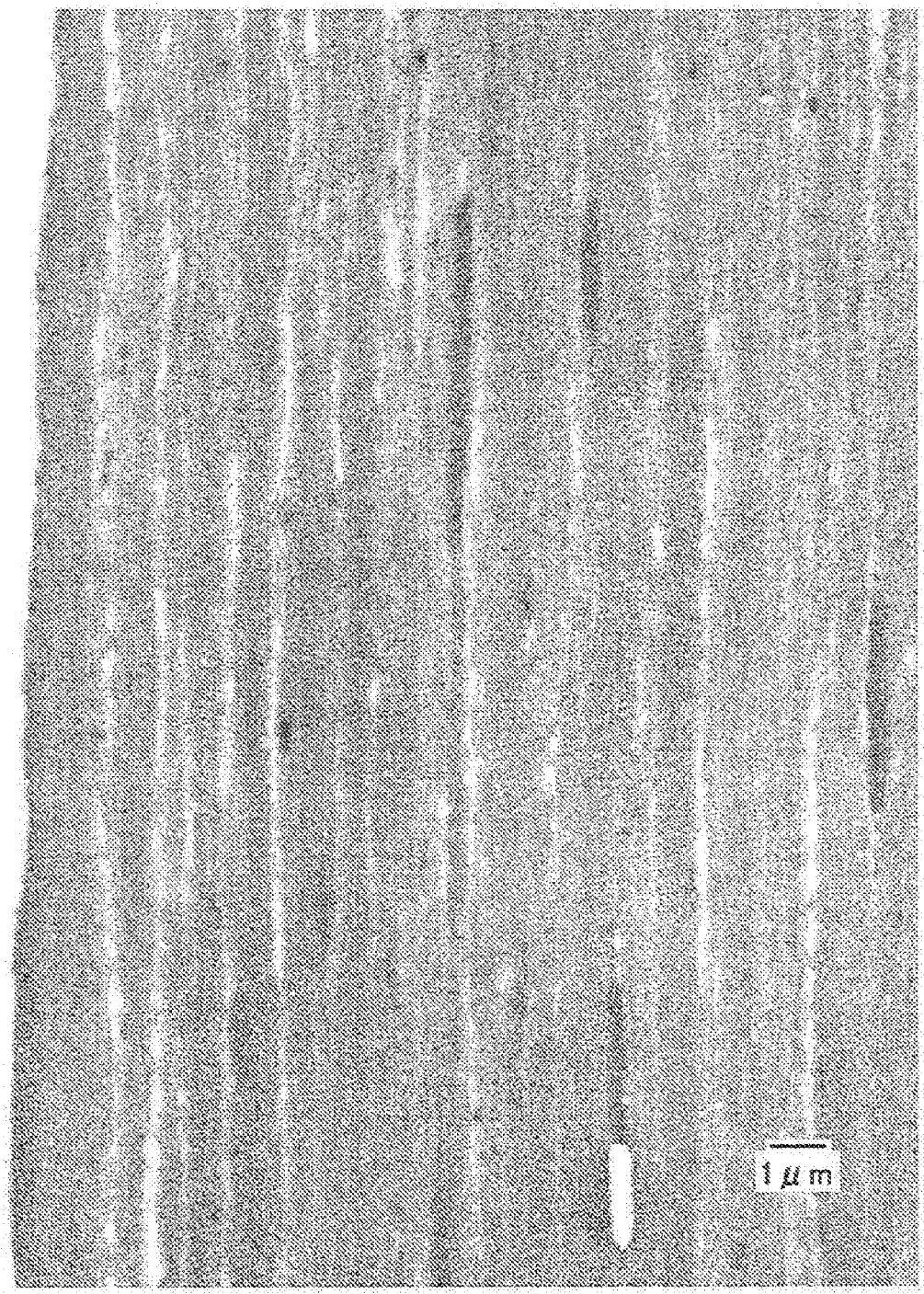
FIG. 3 is a TEM image of a film obtained in Comparative Example 1.

A resin composition was manufactured in the same manner as in Example 1, except using 100 parts by weight of a 3-hydroxyalkanoate polymer (Raw material A-2) with a low melt viscosity in place of 100 parts by weight the 3-hydroxyalkanoate polymer (Raw material A-1) and a film was molded by the same method as that of Example 2. Then, the tear strength of the film and the maximum major axis and the average major axis of PHBH phases were calculated. FIG. 3 shows a TEM image of the film obtained in Comparative Example 1. In FIG. 3, the vertical direction is the MD direction.

Comparative Example 2

A sheet was molded by the same method as that of Example 3 using the resin composition obtained in Comparative Example 1, and then the obtained sheet was measured for the tear strength and the maximum major axis and the average major axis of PHBH phases.

The results of Examples 1 to 3 and Comparative Examples 1 and 2 above are shown in Table 1.

The PHBH phases (white portions in FIG. 1) of the sheet obtained in Example 1 had an oval shape slightly drawn in the MD direction as shown in FIG. 1 but the phases were dispersed at random. As shown in Table 1, the maximum major axis of these PHBH phases was lower than 18 μm and the average major axis was lower than 8 μm.

Moreover, the PHBH phases of the film obtained in Example 2 and the sheet obtained in Example 3 also formed the same dispersion phase as that of Example 1 and the maximum major axis of the PHBH phases of each of the film and the sheet was lower than 18 μm and the average major axis was lower than 8 μm. The tear strength in the MD direction was 40 mN/μm or more in all Examples 1 to 3 and showed a high value.

On the other hand, since the molecular weight is low in the raw material A-2 used in Comparative Example 1 and Comparative Example 2, the melt viscosity is low. Therefore, even when a resin composition and a film or a sheet is molded under the same conditions as those of Example 1 or 2, the PHBHs (white portions in FIG. 3) were drawn and oriented in the DM direction as shown in FIG. 3 and the maximum major axis was larger than 18 μm and the average major axis was larger than 8 μm, and thus layered phases with a very large major axis were formed. Therefore, the tear strength was a low value as compared with the values of Examples 1 and 2.

Examples 4 and 5

(Manufacturing of Resin Composition)

80 parts by weight of the polyester B-1 (PBAT), 25 parts by weight of the polyester B-2 (PBS), and 25 parts by weight of the modified-glycerin compound C-1 (acetylated monoglyceride) based on 100 parts by weight of the 3-hydroxyalkanoate polymer (Raw material A-3) were melted and kneaded with a twin screw extruder at a preset temperature of 100 to 130° C. and at a screw rotation speed of 100 rpm, thereby obtaining a polyester resin composition containing PHBH.

In Example 4, a film was molded by the same method as that of Example 1 and, in Example 5, a film was molded by the same method as that of Example 2. In the obtained films, the tear strength and the maximum major axis and the average major axis of PHBH phases were calculated in the same manner as in Example 1.

TABLE 1

|  |  | Example | | | Comparative Example | | |
| --- | --- | --- | --- | --- | --- | --- | --- |
|  |  | 1 | 2 | 3 | 1 | 2 | 7 |
| A-1 | parts by weight | 100 | | | | | |
| A-2 | | | | | 100 | | |
| B-1 | parts by weight | | 100 | | 100 | | |
| B-2 | | | 50 | | 50 | | |
| C-1 | parts by weight | | 25 | | 25 | | |
| Molded article form | | Film | Film | Sheet | Film | Sheet | Film |
| Molded article thickness | μm | 20 | 41 | 105 | 39 | 103 | 22 |
| Melt viscosity ratio | — | 0.64 | 0.64 | 0.64 | 0.28 | 0.28 | 0.28 |
| Withdrawal speed | m/min | 14 | 11 | 3 | 11 | 3 | 15 |
| Maximum major axis | μm | 7.9 | 7.3 | 5.7 | 22.7 | 20.1 | 24.1 |
| Average major axis | μm | 2.5 | 2.3 | 1.6 | 10.1 | 8.9 | 12.0 |
| Tear strength | mN/μm | 43.6 | 45.6 | 50.1 | 13.8 | 15.2 | 9.7 |

Example 6

The resin composition obtained in Example 4 was molded into a sheet by the same method as that of Example 3, and then the obtained sheet was measured for the tear strength and the maximum major axis and the average major axis of PHBH phases.

Example 7

A polyester resin composition was obtained by the same method as that of Example 4, except using the raw material A-4 in place of the raw material A-3.

A sheet was molded by the same method as that of Example 3 using the obtained polyester resin composition, and then the obtained sheet was measured for the tear strength and the maximum major axis and the average major axis of PHBH phases.

Comparative Example 3

A polyester resin composition was manufactured in the same manner as in Example 5, except using 100 parts by weight of the raw material A-2 in place of 100 parts by weight of the raw material A-3.

The obtained polyester resin composition was molded into a film by the same method as that of Example 5, and then the obtained film was measured for the tear strength and the maximum major axis and the average major axis of PHBH phases.

Comparative Example 4

The resin composition obtained in Comparative Example 3 was molded into a sheet by the same method as that of Example 6, and then the obtained sheet was measured for the tear strength and the maximum major axis and the average major axis of PHBH phases.

The results of Examples 4 to 7 and Comparative Examples 3 and 4 above are shown in Table 2.

TABLE 2

|  |  | Example | | | | Comparative Example | | |
| --- | --- | --- | --- | --- | --- | --- | --- | --- |
|  |  | 4 | 5 | 6 | 7 | 3 | 4 | 8 |
| A-2 | parts by weight |  |  |  |  | 100 |  |  |
| A-3 |  |  | 100 |  |  |  |  |  |
| A-4 |  |  |  |  | 100 |  |  |  |
| B-1 | parts by weight |  | 80 |  |  |  | 80 |  |
| B-2 |  |  | 25 |  |  |  | 25 |  |
| C-1 | parts by weight |  | 25 |  |  |  | 25 |  |
| Molded article form |  | Film | Film | Sheet | Sheet | Film | Sheet | Film |
| Molded article thickness | μm | 20 | 42 | 106 | 106 | 41 | 105 | 22 |
| Melt viscosity ratio | — | 1.1 | 1.1 | 1.1 | 1.3 | 0.28 | 0.28 | 0.28 |
| Withdrawal speed | m/min | 14 | 11 | 3 | 3 | 11 | 3 | 15 |
| Maximum major axis | μm | 7.4 | 7.0 | 5.6 | 5.5 | * | * | * |
| Average major axis | μm | 2.3 | 2.1 | 1.4 | 1.4 | * | * | * |
| Tear strength | mN/μm | 32.8 | 35.4 | 40.0 | 43.7 | 7.4 | 7.6 | 7.6 |

* PHBH formed a continuous phase, and thus the major axis and the average axis were unmeasurable.

As shown in Table 2, the molecular weight of the PHBH (Raw material A-3) in the films obtained in Examples 4 and 5 and the sheet obtained in Example 6 was high, and therefore the melt viscosity was 1,910 Pa·s, which was higher than that of Ecoflex (Raw material B-1) ((P3HA/PBAT) was 1.0 or more.). Therefore, even when the PHBH composition ratio exceeded 45% by weight of the total resin amount to reach about 50% by weight, phases containing PHBH were able to form a dispersion state. Furthermore, the maximum major axis of the PHBH phases in all the films and the sheets obtained in Examples 4 to 7 was lower than 18 μm and the average major axis was lower than 8 μm, and therefore the tear strength in the MD direction showed a high value in all the films and the sheets. On the other hand, in Comparative Examples 3 and 4, the polyester raw material A-2 formed a continuous phase and did not form an island phase (dispersion phase), and therefore the maximum major axis and the average major axis were not able to be calculated.

Examples 8 to 12

Films were molded by the same method as that of Example 1, except manufacturing polyester resin compositions in the same manner as in Example 1 in the composition shown in Table 3 and adjusting the withdrawal speed as shown in Table 3. For the obtained films, the tear strength and the maximum major axis and the average major axis of PHBH phases were calculated. The results are shown in Table 3.

TABLE 3

|  |  | Example |  |  |  |  |
|---|---|---|---|---|---|---|
|  |  | 8 | 9 | 10 | 11 | 12 |
| A-1 | parts by weight |  |  |  | 100 | 100 |
| A-5 |  | 100 |  |  |  |  |
| A-6 |  |  | 100 | 100 |  |  |
| B-1 | parts by weight | 100 | 100 | 200 | 165 | 300 |
| B-2 |  | 50 | 50 | 100 | 50 | 50 |
| C-1 | parts by weight | 25 | 25 | 25 | 31 | 45 |
| Molded article form |  | Film | Film | Film | Film | Film |
| Molded article thickness | μm | 39 | 40 | 18 | 41 | 43 |
| Melt viscosity ratio | — | 0.52 | 0.69 | 0.69 | 0.64 | 0.64 |
| Withdrawal speed | m/min | 11 | 11 | 23 | 11 | 11 |
| Maximum major axis | μm | 16.6 | 7.0 | 11.2 | 2.9 | 1.3 |
| Average major axis | μm | 6.5 | 2.2 | 4.0 | 1.4 | 0.5 |
| Tear strength | mN/μm | 21.1 | 34.8 | 28.2 | 48.9 | 76.5 |

As shown in Table 3, since the maximum major axis in each of the films obtained in Examples 8 to 12 was lower than 18 μm and the average major axis was lower than 8 μm in each of the films, and therefore the tear strength in the MD direction showed a high value.

Comparative Example 5

A resin composition was manufactured in the same manner as in Example 2, except not using the modified-glycerin compound C-1, a film was molded from the resin composition, and then, for the obtained film, the tear strength and the maximum major axis and the average major axis of PHBH phases were calculated. The results are shown in Table 4.

TABLE 4

|  |  | Example 2 | Comparative Example 5 | Comparative Example 6 |
|---|---|---|---|---|
| A-1 | parts by weight | 100 | 100 | 100 |
| A-2 | parts by weight |  |  |  |
| B-1 | parts by weight | 100 | 100 | 100 |
| B-2 |  | 50 | 50 | 50 |
| C-1 | parts by weight | 25 |  |  |
| Castor oil fatty acid | parts by weight |  |  | 25 |
| Molded article form |  | Film | Film | — |
| Molded article thickness | μm | 41 | 40 | — |
| Melt viscosity ratio | — | 0.64 | 0.64 | — |
| Withdrawal speed | m/min | 11 | 11 | — |
| Maximum major axis | μm | 7.3 | 24.4 | — |
| Average major axis | μm | 2.3 | 11.8 | — |
| Tear strength | mN/μm | 45.6 | 9.8 | — |

In Comparative Example 5, the maximum major axis and the average major axis are all large as compared with those of Example 2 and conversely the tear strength is low. From this fact, it is imagined that when there was no modified-glycerin compound C-1, the maximum major axis and the average major axis became long in the non-continuous phase containing the PHBH in the resin composition and a thin phase as in Example 1 was not obtained, and, as a result, the tear strength became low.

Comparative Example 6

The manufacturing of a resin composition was attempted with the same formula as that of Example 1, except using castor oil fatty acid (manufactured by Itoh Oil Chemicals Co., Ltd.) as a compound similar to the modified-glycerin in place of the modified-glycerin compound C-1 (The composition is shown in Table 4.). However, even when kneaded with resin such as the raw material A-1 and the raw materials B-1 and B-2, they were not compatible with each other and bleed-out occurred, so that a resin composition was not able to be obtained.

Comparative Example 7

A resin composition was manufactured in the same manner as in Example 1, except using 100 parts by weight of a 3-hydroxyalkanoate polymer (Raw material A-2) with a low melt viscosity in place of 100 parts by weight of the 3-hydroxyalkanoate polymer (Raw material A-1), a film was molded in the same manner as in Example 1, except setting the withdrawal speed to 15 m/min, and then the tear strength and the maximum major axis and the average major axis of PHBH phases were calculated from a TEM image. The results are shown in Table 1 and the maximum major axis and the average major axis were all large as compared with those of Example 2 and conversely the tear strength was low as in Comparative Example 5.

Comparative Example 8

A resin composition was manufactured in the same manner as in Example 4, except using 100 parts by weight of the raw material A-2 in place of 100 parts by weight of the raw material A-3, and a film was molded in the same manner as in Example 1, except setting the withdrawal speed to 15 m/min. When a TEM image of the obtained film was confirmed, PHBH phases formed a continuous phase, and therefore the maximum major axis and the average major axis were not be able to be calculated. The tear strength was measured to be as low as 5.9 mN/μm. These results are shown in Table 2.

The invention claimed is:
1. A film or a sheet, which is obtained by molding a biodegradable polyester resin composition by a blown film method or a T-die extrusion method, wherein the biodegradable polyester resin composition comprises:
polybutylene adipate terephthalate (PBAT) in a proportion of 60 to 400 parts by weight based on 100 parts by weight of aliphatic polyester (P3HA) having a repeating unit represented by

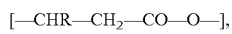 Formula (1):

wherein R is an alkyl group represented by $C_nH_{2n+1}$ and n is an integer of 1 or more and 15 or lower; and acetylated monoglyceride in a proportion of 10 to 50 parts by weight based on 100 parts by weight of the aliphatic polyester (P3HA) having a repeating unit represented by the Formula (1); and wherein a maximum major axis of phases containing the aliphatic polyester (P3HA) measured by a transmission electron microscopy analysis-image analysis method (TEM method) is 18 μm or lower and an average value is 8 μm or lower, and wherein a ratio (P3HA/PBAT) of a melt viscosity of the aliphatic polyester (P3HA) to a melt viscosity of the polybutylene adipate terephthalate (PBAT) is 0.5 or more.

2. The film or sheet-according to claim 1, wherein the aliphatic polyester (P3HA) is at least one member selected from the group consisting of poly(3-hydroxybutyrate-co-3-hydroxyhexanoate)(PHBH), poly(3-hydroxybutyrate) (P3HB), poly(3-hydroxybutyrate-co-3-hydroxyvalerate) (PHBV), poly(3-hydroxybutyrate-co-4-hydroxybutyrate) (P3HB4HB), poly(3-hydroxybutyrate-co-3-hydroxyoctanoate), and poly(3-hydroxybutyrate-co-3-hydroxyoctadecanoate).

3. The film or sheet according claim 1, wherein the aliphatic polyester (P3HA) has a melt viscosity at 160° C. of 900 to 3,600 Pa·s.

4. The film or sheet-according claim 1, wherein the biodegradable polyester resin composition further contains polybutylene succinate (PBS) in a proportion of 20 to 150 parts by weight based on 100 parts by weight of the aliphatic polyester (P3HA).

5. The film or sheet-according to claim 4, wherein a proportion of the aliphatic polyester (P3HA) based on a total amount of the aliphatic polyester (P3HA), the polybutylene adipate terephthalate (PBAT), and the polybutylene succinate (PBS) is 45% by weight or lower.

6. The film or the sheet according to claim 1, wherein a withdrawal speed in molding is 30 m/min or lower.

7. The film or sheet-according to claim 2, wherein a melt viscosity at 160° C. of the aliphatic polyester (P3HA) is 900 to 3,600 Pa·s.

8. The film or sheet-according to claim 2, wherein the biodegradable polyester resin composition further contains polybutylene succinate (PBS) in a proportion of 20 to 150 parts by weight based on 100 parts by weight of the aliphatic polyester (P3HA).

9. The film or sheet-according to claim 3, wherein the biodegradable polyester resin composition further contains polybutylene succinate (PBS) a proportion of 20 to 150 parts by weight based on 100 parts by weight of the aliphatic polyester (P3HA).

10. The film or sheet according to claim 8, wherein a proportion of the aliphatic polyester (P3HA) based on a total amount of the aliphatic polyester (P3HA), the polybutylene adipate terephthalate (PBAT), and the polybutylene succinate (PBS) is 45% by weight or lower.

11. The film or sheet according to claim 9, wherein a proportion of the aliphatic polyester (P3HA) based on a total amount of the aliphatic polyester (P3HA), the polybutylene adipate terephthalate (PBAT), and the polybutylene succinate (PBS) is 45% by weight or lower.

* * * * *